Oct. 4, 1932.   A. R. HOEFT   1,881,023
POULTRY FEEDER
Filed Sept. 3, 1929   2 Sheets-Sheet 1

Inventor
Adolph R. Hoeft
By Arthur Wm. Nelson
Attorney

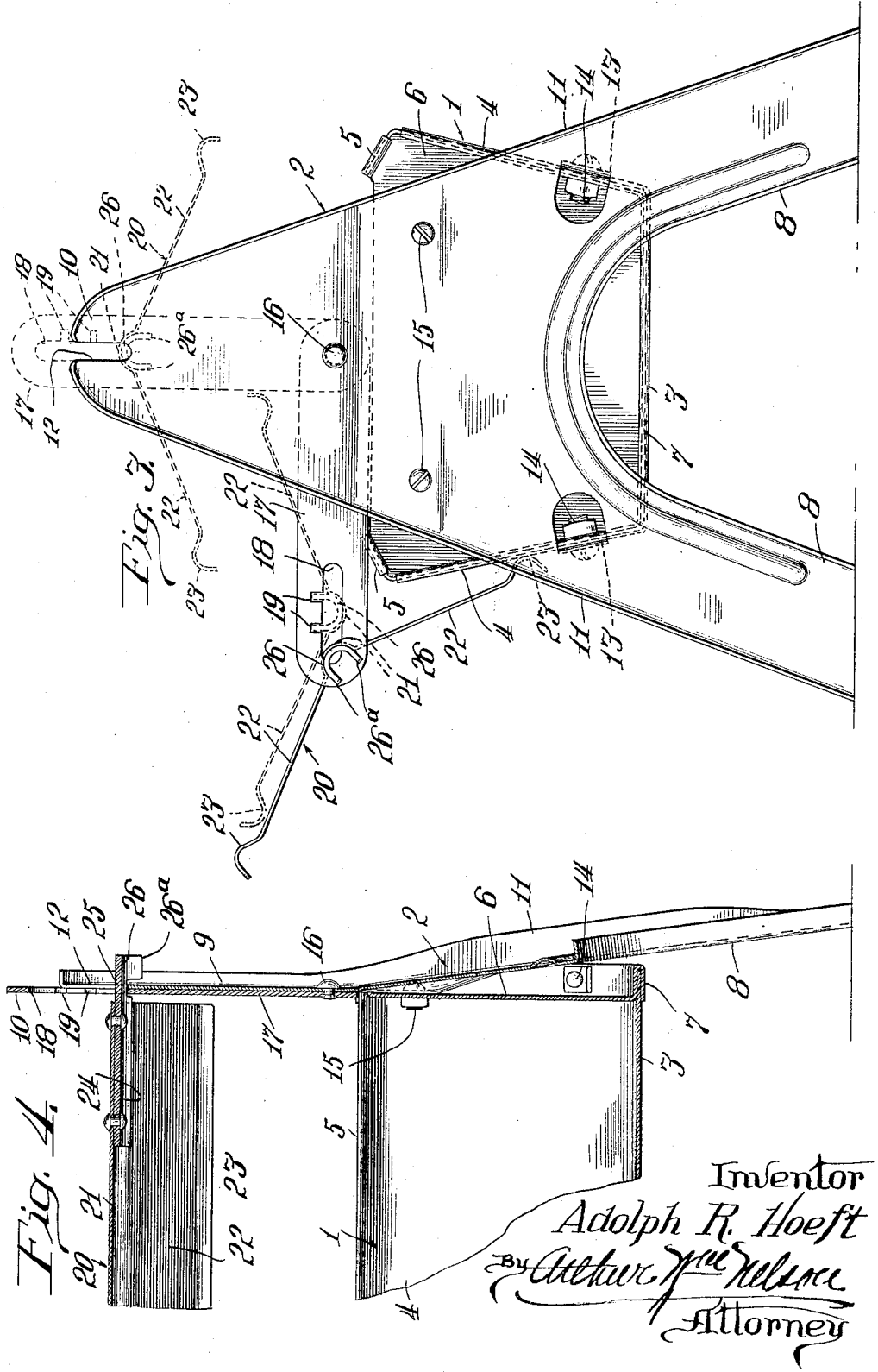

Patented Oct. 4, 1932

1,881,023

UNITED STATES PATENT OFFICE

ADOLPH R. HOEFT, OF EVANSTON, ILLINOIS, ASSIGNOR TO HOEFT & COMPANY, INC., OF NORTH CHICAGO, ILLINOIS, A CORPORATION OF ILLINOIS

POULTRY FEEDER

Application filed September 3, 1929. Serial No. 390,077.

This invention relates to improvements in poultry feeders and it consists of the matters hereinafter described and more particularly pointed out in the appended claims.

The primary object of the invention is to provide a feeder of this kind which includes a cover or top above the trough to protect the feed against the weather elements and so mounted as to prevent the roosting of the chickens thereon and the resulting soiling thereof.

Another object of the invention is to provide a feeder of this kind, which includes a tilting top which may be readily positioned at one side of the feeder without removal therefrom to give free access to the trough as in cleaning and refilling the same.

Still another object of the invention is to provide a feeder which may be shipped in a knocked down condition and which is so simple in construction that it may be readily assembled for its intended use.

These objects of the invention as well as others together with the many advantages thereof will more fully appear as I proceed with my specification.

In the drawings:—

Fig. 3 is a view in end elevation of the same.

Fig. 4 is a vertical sectional view through one end of the improved feeder as taken on the line 4—4 of Fig. 1.

Figure 1:
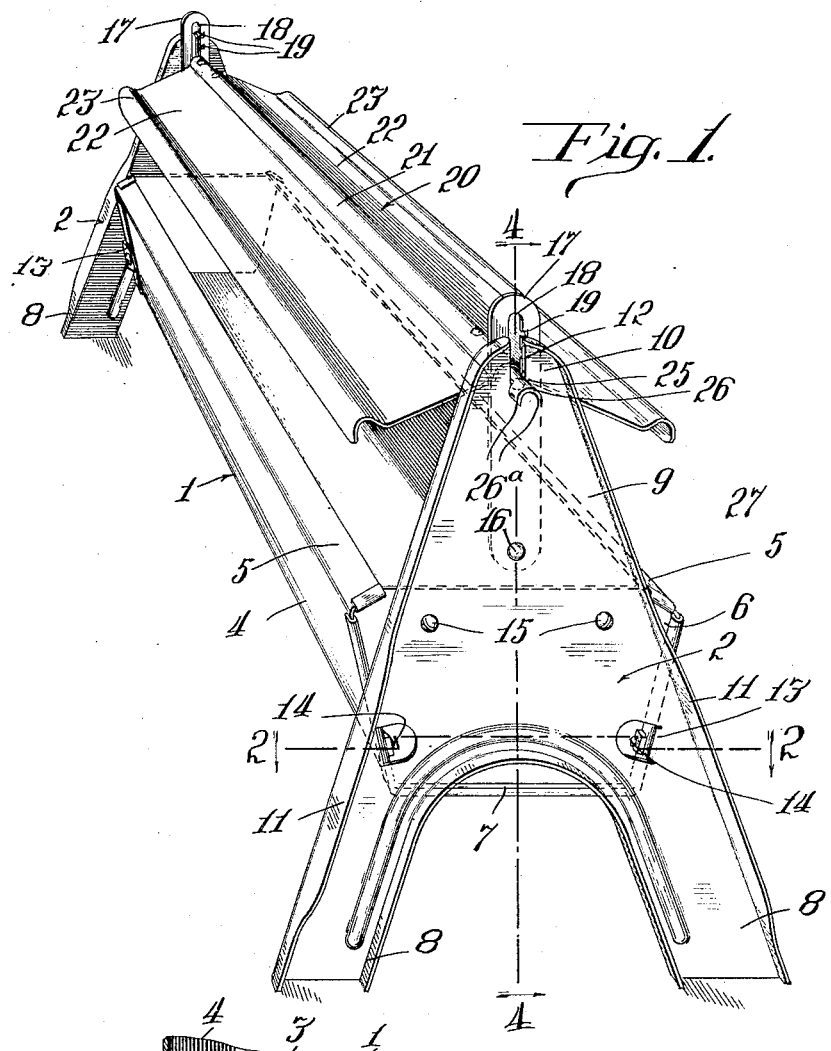
Fig. 1 is a perspective view of a poultry feeder made in accordance with one embodiment of the invention.
Figure 2:
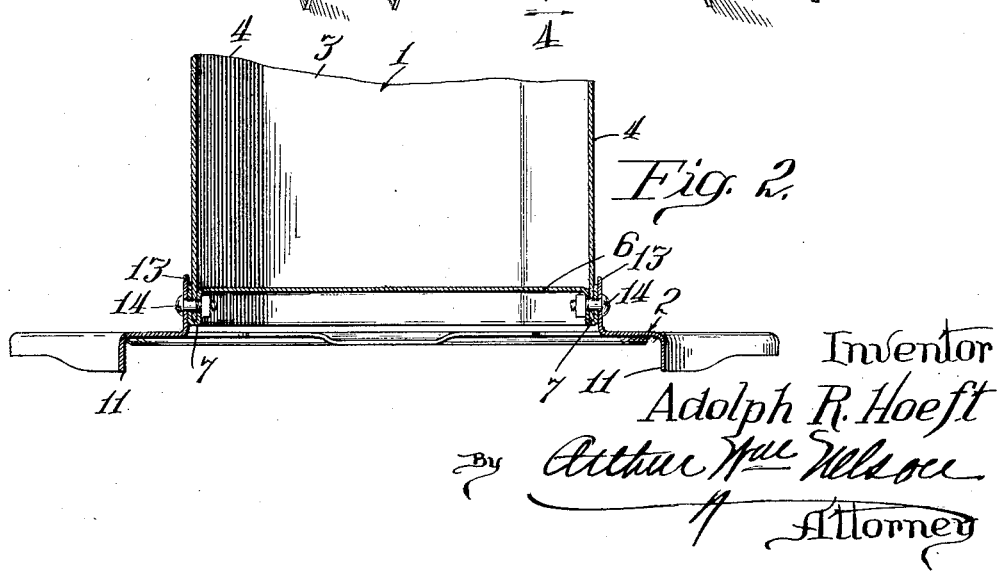
Fig. 2 is a horizontal detail sectional view through one end of the same as taken on the line 2—2 of Fig. 1.

Referring now in detail to that embodiment of the invention illustrated in the accompanying drawings, my improved feeder which is made entirely of sheet metal has a considerable length and includes a trough 1 and end supporting members 2—2. The trough comprises a bottom wall 3, and upwardly and outwardly diverging or inclined side walls 4—4 each of which terminates in an inwardly and upwardly extending flange 5. Said flange not only stiffens the trough but prevents the feeding chickens from throwing the feed out of the trough either with their beaks or claws.

The ends of said trough are formed by end plates 6—6, each having a relatively deep double walled bead 7 to receive the end portions of the side and end walls of the trough. Said beads are secured to said flange against relative separation as will soon appear.

The supporting members 2—2 are each substantially of an inverted V shape and each includes laterally spaced converging legs 8—8 and a top body part 9 which terminates in an apex end 10. Said supporting member 2—2 are each outwardly flanged about their margins as at 11 and are suitably stiffened thereby and in said apex end 10 is formed a perpendicularly disposed slot 12 which opens through said end. The top portion of each leg is punched to form an inwardly extending ear 13 so disposed as to engage with a portion of the bead flange 7 on the end wall of the trough and bolts 14 are inserted through the said ear and trough parts to detachably secure them together. Bolts 15 extend through the body of said supporting members 2—2 and said trough end plates 6 respectively to assist the bolts 14 in securing the parts together in assembled relation as a strong and rigid structure.

Pivoted at 16 to the inner face of each supporting member, in the vertical plane of the slot 12, a short distance above the top of the trough 1 is the bottom end of a link 17. In the top end of each link is formed a longitudinal slot 18 having a pair of notches 19 opening into one side thereof. When the said links stand perpendicularly, the slots 18 register with the slots 12 in the end supporting members, with the top ends of said slots 18 extending upwardly beyond the open top end of the associated slot 12. The purpose of this link and slot arrangement will soon appear.

Associated with the structure thus far described is a top or cover 20 which in its normal position above the trough acts to prevent roosting thereon. Such a cover also acts as a rain shed and prevents the feeding chickens from getting into the trough. Said top or cover includes a central, transversely arched ridge 21 and downwardly and outwardly inclined cover or roof deck like parts 22—22 each terminating in a transversely arched bead or eave 23. This transversely arched ridge and together with the eaves bead portions impart strength and rigidity to the cover as a whole which has a substantial length, approximating in the ordinary size feeder about five feet.

Projecting from each end of the ridge portion 21, is a pintle member, the body 24 of which is riveted to the underside of said ridge portion. Each pintle member includes a neck 25 of a width approximating that of the slots 12 and 18 and a transversely curved head 26 of a width greater than that of said slots. Said head has parallel extensions 26a—26a spaced apart a distance equal to the spacing between the notches 19—19 opening into the slot 18 in each link 17.

To apply the cover in place, after the trough and end supporting members have been assembled together, the links 17—17 are swung into a horizontal position as shown in Fig. 3 wherein they rest upon the inclined flange 5 of the trough 1. The cover is reversed in position, top for bottom and the outer ends of each link 17 is sprung outwardly toward the plane of the associated supporting member 2. The extensions 26a of the head 26 at one end of the cover is then inserted through the notches 19 so that said head may be passed through said slot. The head 26 on the other end of the top or cover is inserted through the slot 18 in its associated link 17. The left hand side of the cover is then tipped downwardly to swing the cover about the necks 25 in the pintle members and will assume the position shown in full lines in Fig. 3. This gives full access to the trough for cleaning and filling with feed.

To swing the cover into its normal position above the trough, the cover and links are swung upwardly about the pivots 16 and in this movement, the heads 26 will engage the rounded top end part of each supporting member 2 near slot 12. This will cause said necks 25 to move outwardly in the slots 18 of the links 17 and as said heads ride up over said rounded parts of said end supporting members, the slots 18 will register with the slots 12, when said necks will drop by gravity thereinto as shown in Fig. 1. The cover is then turned over or reversed to take its normal position as shown in Fig. 1.

With the parts in the normal position shown in Fig. 1, it is apparent that a horizontally elongated opening 27 is provided at each side of the feeder, through which the chickens feed from the trough. Should they attempt to enter the trough through said opening, they will engage the adjacent eaves bead of the top or cover and will swing the same downwardly. Thus said opening becomes restricted and the chickens will then withdraw and give up the attempt to enter the trough in this manner.

Should the chickens hop upon the top or cover for the purpose of roosting thereon, said top or cover will tilt or swing under the weight of the chicken, which upon losing its balance will immediately hop or fall off the cover or top. Thus roosting on the cover or top is discouraged and prevented.

To expose the trough for cleaning and refilling, the cover need not be removed therefrom. It is only necessary to lift up on the cover to free the necks 25 from the slots 12 and the cover and links are then swung about the pivots 16 to one side of the trough and the cover is then turned over into the position shown in full lines in Fig. 3.

The feeder is indeed a simple and efficient one. It protects the feed against the weather elements and prevents the waste thereof by scratching the same out of the trough. As the chickens cannot roost on the cover, the same is kept clean and sanitary. The feeder may be readily shipped in a knocked down condition and may be easily assembled by a novice.

While in describing the invention, I have referred in detail to the form, arrangement and construction of the various parts thereof, the same is to be considered merely as illustrative of one embodiment of the invention so that I do not wish to be limited thereto except as may be specifically set forth in the appended claims.

I claim as my invention:—

1. A feeder embodying therein, end members each having an upwardly opening slot in the top end thereof, links each pivoted at one end to an associated end member and having a slot in the other end, a cover, and means on said cover adapted to extend through both of said slots to lock the links in said upright position and provide an axis about which said cover may tilt, said cover upon a movement in the plane of said slots, removing said means thereon from the slots in said end members.

2. A feeder of the kind described embodying therein a feed trough, a supporting member at each end thereof, links each having a connection at one end with an associated supporting member for a pivotal movement only so as to be capable of a swinging movement in the plane of said supporting members and each having a longitudinal slot in its other end and a tiltable cover member having end portions extending through the slots in said links and having a pivotal engagement in said supporting members, said end portions of the cover when the same is lifted upwardly in said slots, clearing the top ends of said supporting member so that said cover and links may be swung to one side or the other of said supporting members.

3. A feeder of the kind described embodying therein a feed trough, a supporting member at each end thereof and each having a perpendicular slot opening through the top end thereof, links each having a connection at one end with an associated supporting member for a pivotal movement only, so as to be capable of a swinging movement in the plane of said supporting members and each having a longitudinal slot in its other end, a tiltable cover member having end portions extending through the slots in said links and having a pivotal engagement in the bottom ends of the slots in said supporting members, said end portion of the cover when the same is lifted upwardly in said slots clearing the top ends of said supporting members so that said cover and links may be swung to one side or the other of said supporting members.

4. A feeder of the kind described embodying therein a feed trough, a supporting member at each end thereof and each having a perpendicular slot opening through the top end thereof, links each having a connection at one end with an associated supporting member for a pivotal movement only, so as to be capable of a swinging movement in the plane of said supporting members and each having a longitudinal slot in its other end, a cover member, means on each end of the cover member including a neck and a head and which necks are adapted to extend through said slots to have a pivotal engagement in the bottom ends of the slots in said supporting members and to bring the heads on the outside of said supporting members and which heads are wider than the slots in said supporting members, said necks of said means on said cover members, when the same is lifted upwardly, passing out through and beyond the slots in said supporting members to clear the same so that said links and cover may be swung to one side or the other of said supporting members.

5. A feeder of the kind described embodying therein a feed trough, a supporting member at each end thereof and each having a perpendicular slot opening through the top end thereof, links each having a connection at one end with an associated supporting member for a pivotal movement only, so as to be capable of a swinging movement in the plane of said supporting members and each having a longitudinal slot in its other end with notches opening into at least one side thereof, a cover member, means on each end of said cover member including a neck and a head and which necks are adapted to extend through said slots to bring the heads on the outside of said supporting members, said heads including portions for registration with the notches opening into the slots in said links so that said heads may be passed therethrough, said necks of said means on said cover member when the same is lifted upwardly, passing through and beyond the slots in said supporting members to clear the same so that said links and covers may be swung to one side or the other of said supporting members.

In testimony whereof, I have hereunto set my hand, this 28th day of August, 1929.
ADOLPH R. HOEFT.